(12) United States Patent
Xiong et al.

(10) Patent No.: US 10,632,615 B2
(45) Date of Patent: Apr. 28, 2020

(54) SERVO DRIVING METHOD, APPARATUS, AND ROBOT THEREOF

(71) Applicant: UBTECH Robotics Corp, Shenzhen (CN)

(72) Inventors: Youjun Xiong, Shenzhen (CN); Dong Liu, Shenzhen (CN); Zhenmin Mo, Shenzhen (CN); Zhongliang Wang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/161,099

(22) Filed: Oct. 16, 2018

(65) Prior Publication Data

US 2019/0160659 A1    May 30, 2019

(30) Foreign Application Priority Data

Nov. 27, 2017    (CN) .......................... 2017 1 1202515

(51) Int. Cl.
*B25J 9/16* (2006.01)
*B25J 9/00* (2006.01)
*G05B 6/02* (2006.01)

(52) U.S. Cl.
CPC .............. *B25J 9/16* (2013.01); *B25J 9/0009* (2013.01); *G05B 6/02* (2013.01); *G05B 2219/42238* (2013.01)

(58) Field of Classification Search
CPC .. B25J 9/16; B25J 9/0009; G05B 6/02; G05B 2219/42238
See application file for complete search history.

(56) References Cited

U.S. PATENT DOCUMENTS

| 2002/0008487 | A1* | 1/2002 | Ichikawa | B60Q 1/115 |
| | | | | 318/560 |
| 2014/0091741 | A1* | 4/2014 | Ko | H02P 27/02 |
| | | | | 318/400.13 |
| 2016/0221188 | A1* | 8/2016 | Nagai | B25J 9/1612 |

* cited by examiner

*Primary Examiner* — Cortez M Cook

(57) ABSTRACT

The present disclosure provides a servo driving method, device, and robot thereof. The method includes: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio. Which controls the motor to drive the servo through the obtained target PWM signal, and realizes that the rotation speed of the motor will not become unstable due to the change of the output voltage of the power supply during the operation of the motor, thereby avoiding the instability of the servo.

12 Claims, 5 Drawing Sheets

SERVO DRIVING METHOD, APPARATUS, AND ROBOT THEREOF

CROSS REFERENCE TO RELATED APPLICATIONS

This application claims priority to Chinese Patent Application No. 201711202515.X, filed Nov. 27, 2017, which is hereby incorporated by reference herein as if set forth in its entirety.

BACKGROUND

1. Technical Field

The present disclosure relates to servo control technology, and particularly to a servo driving method, apparatus, and robot thereof.

2. Description of Related Art

With the increment of labor costs, more and more manufacturing industries are increasingly using robotic jobs to replace manual jobs. When the existing robot performs the assembly line operations, it is necessary to control the robot arm to perform the operations such as grasping, assembly, and transportation of objects, and the control and execution of these operations are inevitably to use servos.

A servo needs to be driven by a motor. However, since the power supply of the existing motor mostly uses a mobile power supply such as a lithium battery, the motor is easy to be unstable in its the rotation speed when operating due to the change in the output voltage of the power supply, and further causes the signs of instability in the servo's operation such as the jittering or the larger error in the operating position.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

It should be noted that, in all embodiments of the present disclosure, a servo is driven by a motor, and the motor is supplied with working power by a power supply.

Figure 1:
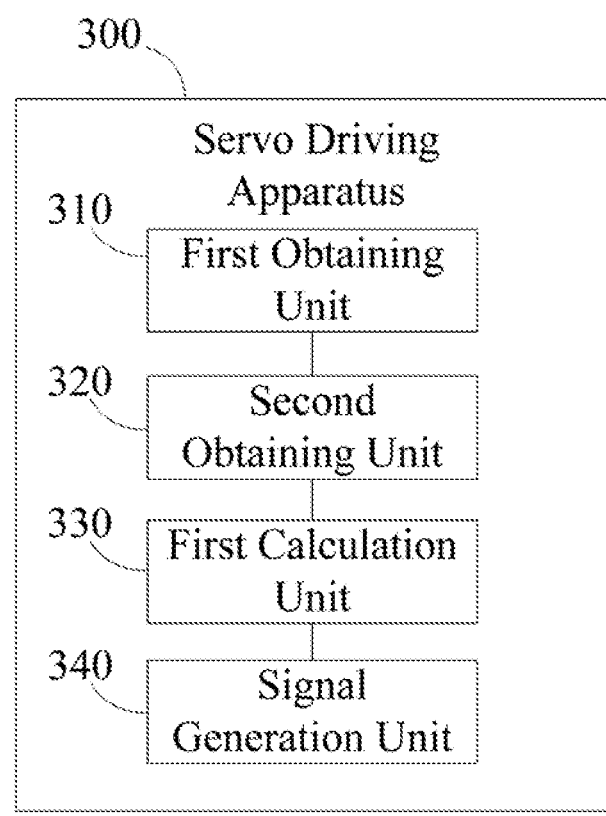
FIG. 1 is a schematic block diagram of the structure of an embodiment of a servo driving apparatus according to the present disclosure.

FIG. 1 is a schematic block diagram of the structure of an embodiment of a servo driving apparatus according to the present disclosure. As shown in FIG. 1, a servo driving apparatus 300 includes units for performing the steps in the embodiment corresponding to FIG. 4. For details, please refer to FIG. 4 and the related description in the embodiment corresponding to FIG. 4, and details are not described herein. In this embodiment, the apparatus 300 includes a first obtaining unit 310, a second obtaining unit 320, a first calculation unit 330, and a signal generation unit 340, while each of the units may be implemented in the form of hardware (e.g., a circuit), software (e.g., a program), or a combination thereof (e.g., a circuit with a single chip microcomputer). The apparatus 300 is installed in a robot. The robot is provided with a plurality of servos, where each of the servos is driven by a motor, and may be used as a joint of the robot so as to realize the movement of a limb of the robot which connected to the joint. The movement of the servo specifically means the rotation of an output shaft of the servo which is driven by the motor. The apparatus 300 may include one or more processors, a storage, and one or more computer programs stored in the storage and executed by the processor, where the one or more computer programs include the above-mentioned units.

The first obtaining unit 310 is configured to obtain a current voltage of a power supply of the motor, if a control instruction for driving the servo is detected.

For example, if the first obtaining unit 310 has detected the control instruction for driving the servo, it obtains the current voltage of the power supply of the motor.

The second obtaining unit 320 is configured to obtain a duty ratio of a PWM signal generated according to the control instruction and the current voltage, if the current voltage is not equal to a preset voltage.

For example, if the second obtaining unit 320 determines that the current voltage is not equal to the preset voltage, it obtains the duty ratio of the PWM signal generated according to the control instruction and the current voltage.

The first calculation unit 330 is configured to calculate a target duty ratio based on a ratio between the preset voltage and the current voltage and the duty ratio.

The signal generation unit 340 is configured to output a target PWM signal according to the target duty ratio, where the target PWM signal is for controlling the motor to drive the servo.

As can be seen from the above, in this embodiment, the servo driving apparatus is implemented by: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio. Which controls the motor to drive the servo through the obtained target PWM signal, and realizes that the rotation speed of the motor will not become unstable due to the change of the output voltage of the power supply during the operation of the motor, thereby avoiding the instability in the operation of the servo.

Figure 2:
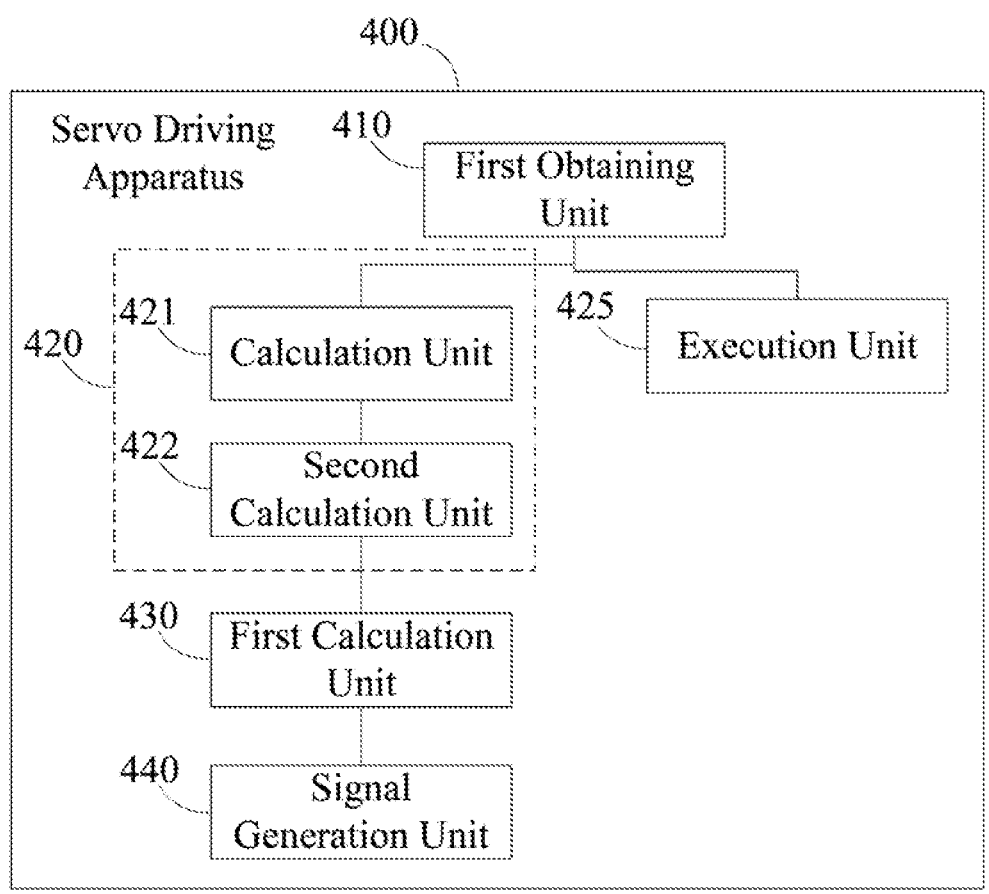
FIG. 2 is a schematic block diagram of the structure of another embodiment of a servo driving apparatus according to the present disclosure.

FIG. 2 is a schematic block diagram of the structure of another embodiment of a servo driving apparatus according to the present disclosure. As shown in FIG. 2, servo driving apparatus 400 includes units for performing the steps in the embodiment corresponding to FIG. 5. For details, please refer to FIG. 5 and the related description in the embodiment corresponding to FIG. 5, and details are not described herein. In this embodiment, the apparatus 400 includes a first obtaining unit 410, a second obtaining unit 420, a first calculation unit 430, and a signal generation unit 440. The apparatus 400 is installed in a robot. The robot is provided with a plurality of servos, where each of the servos is driven by a motor, and may be used as a joint of the robot so as to realize the movement of a limb of the robot which connected to the joint. The movement of the servo specifically means the rotation of an output shaft of the servo which is driven by the motor. The apparatus 400 may include one or more processors, a storage, and one or more computer programs stored in the storage and executed by the processor, where the one or more computer programs include the above-mentioned units.

The first obtaining unit 410 is configured to obtain a current voltage of a power supply of the motor, if a control instruction for driving the servo is detected.

For example, if the first obtaining unit 410 has detected the control instruction for driving the servo, it obtains the current voltage of the power supply of the motor.

The second obtaining unit 420 is configured to obtain a duty ratio of a PWM signal generated according to the control instruction and the current voltage, if the current voltage is not equal to a preset voltage.

For example, if the second obtaining unit 420 determines that the current voltage is not equal to the preset voltage, it obtains the duty ratio of the PWM signal generated according to the control instruction and the current voltage.

Furthermore, in this embodiment, the control instruction is further utilized to describe target position information of the servo, and the second obtaining unit 420 includes: a calculation unit 421 and a second calculation unit 422.

The calculation unit 421 is configured to calculate actual position information of the servo under the driving of the PWM signal according to the control instruction.

The second calculation unit 422 is configured to import the target position information and the actual position information into a preset PID control algorithm to perform a cycle operation to obtain the duty ratio.

Furthermore, the second calculation unit 422 is specifically configured to calculate the duty ratio by the following formula:

$$P_V = U_p + U_i + U_d;$$

where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$.

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

In one embodiment, the apparatus 400 further includes an execution unit 425 configured to perform no operation, if the current voltage is equal to the preset voltage.

The first calculation unit 430 is configured to calculate a target duty ratio based on a ratio between the preset voltage and the current voltage and the duty ratio.

Furthermore, the first calculating unit 430 is specifically configured to: calculate a voltage ratio between the preset voltage and the current voltage; and calculate a product of the voltage ratio and the duty ratio of the PWM signal to obtain the target duty ratio.

Specifically, the first calculating unit 430 obtains the target duty ratio information by the following formula:

$$P_N = \frac{Vn}{Vm} \times P_V;$$

where $P_N$ is the target duty ratio, $V_n$ is the preset voltage, $V_m$ is the current voltage, and $P_V$ is the duty ratio.

The signal generation unit 440 is configured to output a target PWM signal according to the target duty ratio, where the target PWM signal is for controlling the motor to drive the servo.

As can be seen from the above, in this embodiment, the servo driving apparatus is implemented by: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio. Which controls the motor to drive the servo through the obtained target PWM signal, and realizes that the rotation speed of the motor will not become unstable due to the change of the output voltage of the power supply during the operation of the motor, thereby avoiding the instability in the operation of the servo.

If the current voltage is equal to the preset voltage, no operation is performed. When the current voltage is normal, it is unnecessary to adjust the PWM signal, thereby avoiding unnecessary operations during driving the servo.

Figure 3:
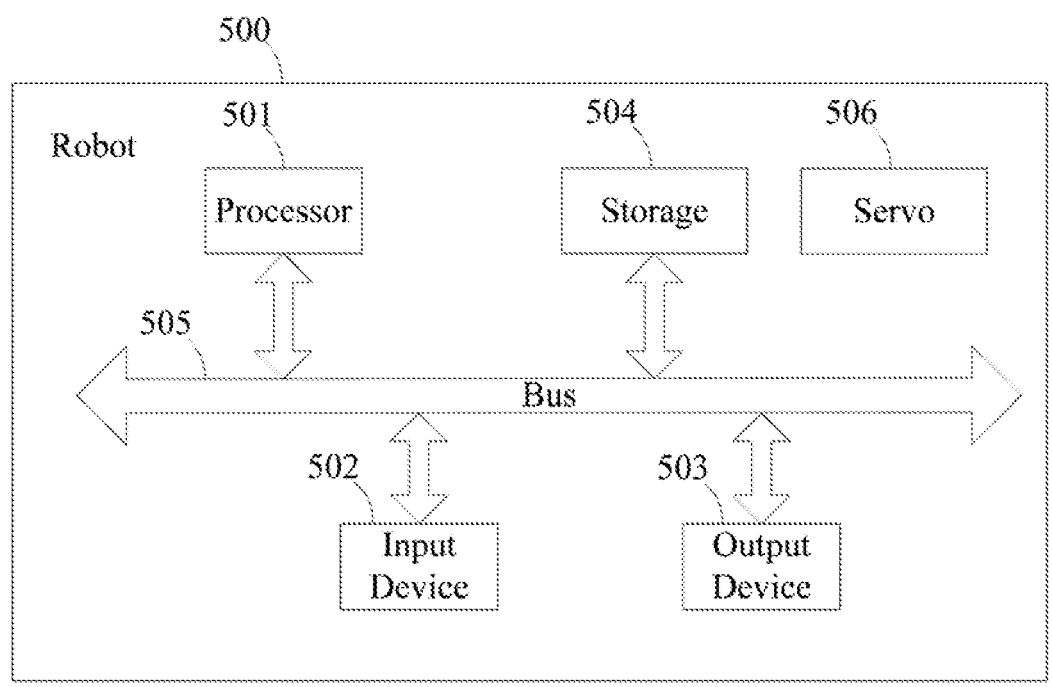
FIG. 3 is a schematic block diagram of an embodiment of a robot according to the present disclosure.

FIG. 3 is a schematic block diagram of an embodiment of a robot according to the present disclosure. As shown in FIG. 3, in this embodiment, a robot 500 may include one or more processors 501, one or more input devices 502, one or more output devices 503, and a storage 504. The above-mentioned processor 501, input device 502, output device 503, and storage 504 are connected by a bus 505. The storage 504 is utilized to storage one or more computer programs including instructions, and the processor 501 performs the following operations by calling the one or more computer program stored in the storage 504. The robot 500 includes servos 506. The servo 506 is driven by a motor, and may be used as a joint of the robot so as to realize the movement of a limb of the robot which connected to the joint, where the movement of the servo 506 specifically means the rotation of an output shaft of the servo 506 which is driven by the motor.

The processor 501 is configured to obtain a current voltage of a power supply of the motor, if a control instruction for driving the servo 506 is detected.

The processor 501 is configured to obtain a duty ratio of a PWM signal generated according to the control instruction and the current voltage, if the current voltage is not equal to a preset voltage.

The processor 501 is configured to calculate a target duty ratio based on a ratio between the preset voltage and the current voltage and the duty ratio.

The processor 501 is configured to output a target PWM signal according to the target duty ratio, where the target PWM signal is for controlling the motor to drive the servo 506.

The processor 501 is further configured to perform no operation, if the current voltage is equal to the preset voltage.

The processor 501 is specifically configured to: calculate actual position information of the servo 506 under the driving of the PWM signal according to the control instruction; and import the target position information and the actual position information into a preset PID control algorithm to perform a cycle operation to obtain the duty ratio.

The processor 501 is specifically configured to:
calculate the duty ratio by the following formula:

$$P_V = U_p + U_i + U_d;$$

where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$.

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

The processor 501 is specifically configured to: calculate a voltage ratio between the preset voltage and the current voltage; and calculate a product of the voltage ratio and the duty ratio of the PWM signal to obtain the target duty ratio.

The processor 501 is specifically configured to make the voltage ratio between the preset voltage and the current voltage not equal to 1.

It should be understood that, in this embodiment, the processor 501 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 502 may include a touch panel, a fingerprint sensor (for collecting fingerprint information of the user and direction information of the fingerprint), a microphone, and the like, and the output device 503 may include a display (LCD or the like), a speaker, and the like.

The storage 504 can include read only memory and random access memory and provides instructions and data to the processor 501. A portion of the storage 504 may also include a non-volatile random access memory. For example, the storage 504 may also store information of the device type.

In an embodiment, the processor 501, the input device 502, and the output device 503, which are described in the embodiments of the present disclosure may implement the embodiments of a servo driving method of the present disclosure (see FIG. 4 and FIG. 5), and may also the embodiment of the servo driving apparatus of the present disclosure, and details are not described herein again.

Figure 4:
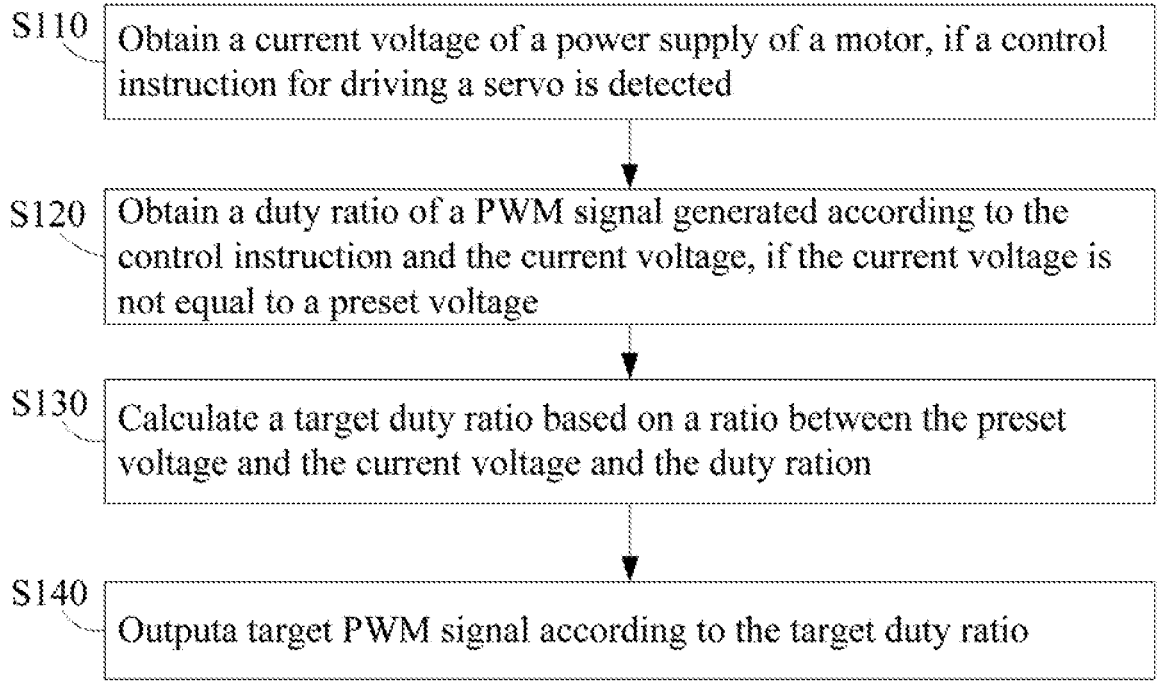
FIG. 4 is a flow chart of an embodiment of a servo driving method according to the present disclosure.

FIG. 4 is a flow chart of an embodiment of a servo driving method according to the present disclosure. In this embodiment, the method is a computer-implemented method executable for a processor. The method is applied to a servo of a robot. The servo is driven by a motor, and may be used as a joint of the robot so as to realize the movement of a limb of the robot which connected to the joint, where the movement of the servo specifically means the rotation of an output shaft of the servo which is driven by the motor. As shown in FIG. 4, the method includes the following steps.

S110: obtaining a current voltage of a power supply of the motor, if a control instruction for driving the servo is detected.

In step S10, the current voltage is utilized to reflect the magnitude of the outputted voltage of the power supply to power the motor In this embodiment, the power supply may include a commercial power source, a battery, a power generator, or the like.

It should be noted that, since the rotation speed of the motor will change due to the change of the voltage of the power supply, upon obtaining the current voltage of the power supply of the motor, whether the rotation speed of the motor matches the control instruction or not can be determined according to the magnitude of the current voltage.

In this embodiment, the control instruction is utilized to drive the servo. Since the servo is driven by the motor, as a possible implementation manner, the control instruction is received by a control circuit of the motor, and the current voltage of the power supply of the motor is obtained in response to receiving the control instruction.

The step of obtaining a current voltage of a power supply of the motor may specifically include: transmitting power request information to the power supply according to the control instruction; and receiving response information returned by the power supply according to the power request information, where the response information reflects the current voltage of the power supply.

For example, transmitting the power request information to a control unit of a battery according to the control instruction; and receiving the response information returned by the control unit of the battery according to the power request information, where the response information reflects the current voltage of the power supply.

It can be understood that, the current voltage of the power supply of the motor can be sampled through a sampling circuit, and the current voltage of the power supply of the motor can be obtained by analyzing and calculating the sampling result.

S120: obtaining a duty ratio of a PWM (pulse width modulation) signal generated according to the control instruction and the current voltage, if the current voltage is not equal to a preset voltage.

In step S120, the preset voltage is the normal working voltage of the motor. The PWM signal is utilized to control the motor to rotate. The duty ratio is utilized to describe the proportion of the high-level duration in a cycle within a single cycle of the PWM signal.

In this embodiment, if the current voltage is not equal to the preset voltage, it indicates that the motor is prone to a rotation speed error at the power supply voltage, which will cause a certain positional deviation or jitter when the servo is driven, and it is necessary to adjust the PWM signal for controlling the motor.

It should be noted that, if the control instructions received twice in succession are the same while the corresponding current voltages are different, the duty ratios of the PWM signal generated according to the control instruction and the current voltage are also different, that is, the states of the rotation of the motor are different. If the current voltage is a non-preset voltage, a duty ratio of the PWM signal generated according to the control instruction and the current voltage is obtained, where the duty ratio can reflect the error of the operation of the motor.

S130: calculating a target duty ratio based on a ratio between the preset voltage and the current voltage and the duty ration.

In step S130, the ratio between the preset voltage and the current voltage is greater than 1 or smaller than 1.

In this embodiment, the current voltage of the power supply may be larger than the preset voltage or smaller than the preset voltage. The ratio between the preset voltage and the current voltage is smaller than 1 when the current voltage of the power supply is larger than the preset voltage, and the ratio between the preset voltage and the current voltage is greater than 1 when the current voltage of the power supply is smaller than the preset voltage.

As an example, when a battery is taken as the power supply, if the battery is overcharged or has a discharge failure, the current voltage of the battery is larger than the preset voltage, and the ratio between the preset voltage and the current voltage of the battery is less than 1; if the battery is used for a period of time, and the current voltage of the battery is less than the preset voltage, the ratio between the preset voltage and the current voltage of the battery is larger than 1.

Step S130 can be described in conjunction with step S120. If the current voltage is not equal to the preset voltage, it indicates that the motor is prone to a rotation speed error at the power supply voltage, which will cause a certain positional deviation or jitter when the servo is driven, and it is necessary to adjust the PWM signal for controlling the motor.

Since the ratio between the preset voltage to the current voltage is different when the PWM signal is adjusted, and the compensation value introduced during the adjustment is also different, by determining the ratio between the preset voltage and the current voltage, the influence of different current voltages on the motor can be differentiated, and the magnitude of the adjustment can be determined accurately, hence the target duty ratio can be determined more accurately.

It can be understood that, if the current voltage is equal to the preset voltage, the ratio between the preset voltage and the current voltage is equal to 1.

S140: outputting a target PWM signal according to the target duty ratio.

In step S140, the target PWM signal is utilized to control the motor to drive the servo, and the target duty ratio is utilized to describe the proportion of the high-level duration in a cycle within the target PWM signal.

It should be noted that, after outputting the target PWM signal according to the target duty ratio, if the posture or the operation state of the servo remains unchanged, the target PWM signal is continuously output.

In this embodiment, if the current voltage of the power supply is not equal to the preset voltage, it indicates that the motor will have a rotational speed deviation due to the voltage and cause the instability in the operation of the servo. In this case, by adjusting the PWM signal for controlling the motor the operate, the motor can operate in a relatively stable state when the current voltage of the power supply is too large or too small, thereby ensuring that the jittering or the larger error in the operating position will not appear when the servo is in operation.

As can be seen from the above, in this embodiment, the servo driving method is implemented by: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio, which controls the motor to drive the servo through the obtained target PWM signal, and realizes that the rotation speed of the motor will not become unstable due to the change of the output voltage of the power supply during the operation of the motor, thereby avoiding the instability in the operation of the servo.

Figure 5:
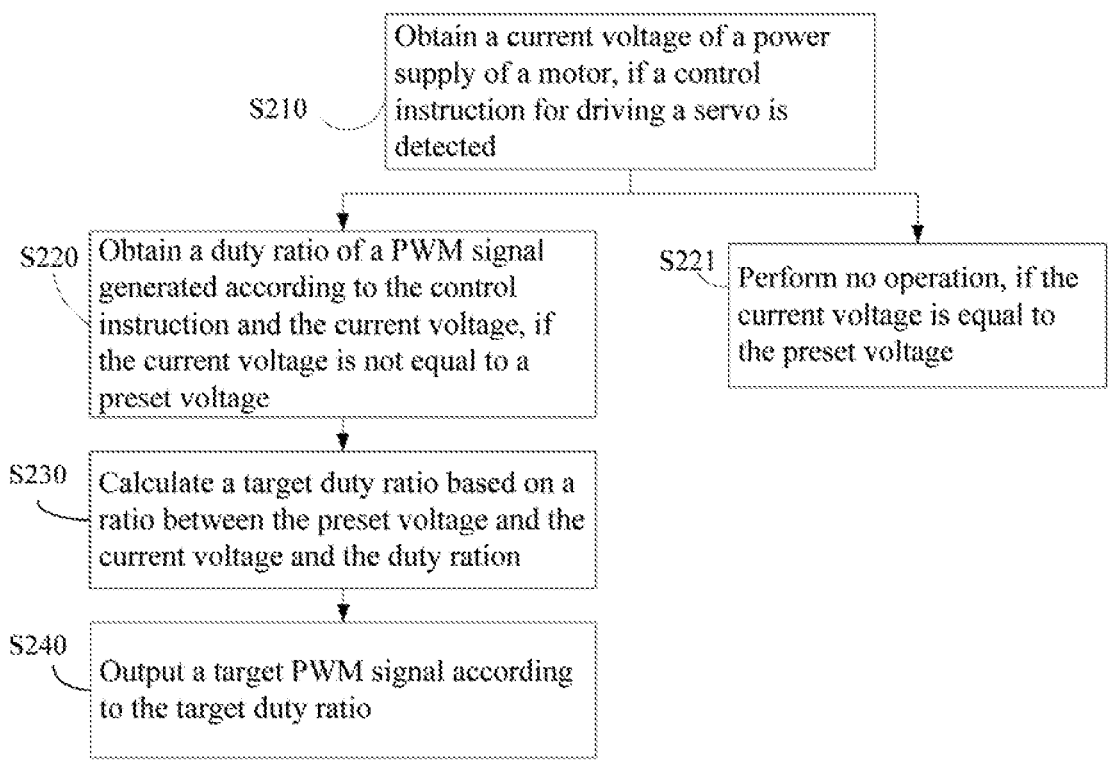
FIG. 5 is a flow chart of another embodiment of a servo driving method according to the present disclosure.

FIG. 5 is a flow chart of another embodiment of a servo driving method according to the present disclosure. As shown in FIG. 5, the method includes the following steps.

S210: obtaining a current voltage of a power supply of the motor, if a control instruction for driving the servo is detected.

In step S210, the current voltage is utilized to reflect the magnitude of the outputted voltage of the power supply to power the motor.

In this embodiment, the power supply may include a commercial power source, a battery, a power generator, or the like.

It should be noted that, since the rotation speed of the motor will change due to the change of the voltage of the power supply, upon obtaining the current voltage of the power supply of the motor, whether the rotation speed of the motor matches the control instruction or not can be determined according to the magnitude of the current voltage.

In this embodiment, the control instruction is utilized to drive the servo. Since the servo is driven by the motor, as a possible implementation manner, the control instruction is received by a control circuit of the motor, and the current voltage of the power supply of the motor is obtained in response to receiving the control instruction.

The step of obtaining the current voltage of the power supply of the motor may specifically include: transmitting power request information to the power supply according to the control instruction; and receiving response information returned by the power supply according to the power request information, where the response information reflects the current voltage of the power supply.

For example, transmitting the power request information to a control unit of a battery according to the control instruction; and receiving the response information returned by the control unit of the battery according to the power request information, where the response information reflects the current voltage of the power supply.

It can be understood that, the current voltage of the power supply of the motor can be sampled through a sampling circuit, and the current voltage of the power supply of the motor can be obtained by analyzing and calculating the sampling result.

S220: obtaining a duty ratio of a PWM signal generated according to the control instruction and the current voltage, if the current voltage is not equal to a preset voltage.

In step S220, the preset voltage is the normal working voltage of the motor. The PWM signal is utilized to control the motor to rotate. The duty ratio is utilized to describe the proportion of the high-level duration in a cycle within a single cycle of the PWM signal.

In this embodiment, if the current voltage is not equal to the preset voltage, it indicates that the motor is prone to a rotation speed error at the power supply voltage, which will cause a certain positional deviation or jitter when the servo is driven, and it is necessary to adjust the PWM signal for controlling the motor.

In this embodiment, the control instruction is utilized to describing target position information of the servo. The step S220 specifically includes: calculating actual position information of the servo under the driving of the PWM signal according to the control instruction; and importing the target position information and the actual position information into a preset proportional adjustment PID (proportional integral derivative) control algorithm to perform a cycle operation to obtain the duty ratio.

It should be noted that, when receiving the control instruction for driving the servo, the PWM signal is generated according to the control instruction and the current voltage.

In this embodiment, the proportional adjustment PID control algorithm is set in advance according to the actual function of the servo or the content of the control instruction, and the control instruction is further utilized to describe the target position information of the servo. By calculating actual position information of the servo at the driving of the PWM signal according to the control instruction, and importing the target position information and the actual position information into the preset proportional adjustment PID control algorithm to perform a cycle operation, the operations of the proportional term, the integral term and the derivative term can be performed through the proportional adjustment PID control algorithm according to the error between the target position information and the actual position information, thereby obtaining the duty ratio.

Furthermore, in this embodiment, the step of importing the target position information and the actual position information into the preset proportional adjustment PID control algorithm to perform the cycle operation to obtain the duty ratio includes:

calculating the duty ratio by the following formula:

$$P_V = U_p + U_i + U_d;$$

where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$.

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

It should be noted that, the proportional term $U_p$ is obtained according to the preset proportional coefficient and the measured error, the integral term $U_i$ is obtained by integrating the error based on time, and the differential term $U_d$ is obtained by differentiating the error based on time, where the above-mentioned error is the error between the current target position and the actual position.

In practical applications, the user may set a corresponding preset proportional coefficient $K_p$, a preset integral coefficient $K_i$, and a preset differential coefficient $K_d$ according to actual requirements of the servo control precision.

It can be understood that, in all embodiments of the present disclosure, the preset proportional adjustment PID control algorithm is a positional PID control algorithm, and the error is accumulated for each time in the process of calculating the duty ratio according to the above-mentioned formula.

In this embodiment, the servo driving method further includes step S221 in parallel with step S220: performing no operation, if the current voltage is equal to the preset voltage.

In step S221, if the current voltage is equal to the preset voltage, the ratio of the preset voltage to the current voltage is 1, that is, the duty ratio of the PWM signal is unnecessary to be calculated through the proportional adjustment PID control algorithm.

It can be understood that, step S221 and step S220 are parallel steps without sequence. If step S220 is executed, step S221 is not performed. If step S221 is executed, step S220 is not executed until the relationship between the current voltage and the preset voltage is re-determined.

S230: calculating a target duty ratio based on a ratio between the preset voltage and the current voltage and the duty ratio In step S230, the ratio between the preset voltage and the current voltage is greater than 1 or smaller than 1.

In this embodiment, step S230 specifically includes: calculating a voltage ratio between the preset voltage and the current voltage; and calculating a product of the voltage ratio and the duty ratio of the PWM signal to obtain the target duty ratio.

Furthermore, the target duty ratio information is obtained by the following formula:

$$P_N = \frac{Vn}{Vm} \times P_V;$$

where $P_N$ is the target duty ratio, $V_n$ is the preset voltage, $V_m$ is the current voltage, and $P_V$ is the duty ratio.

In this embodiment, the current voltage of the power supply may be larger than the preset voltage or smaller than the preset voltage. The ratio between the preset voltage and the current voltage is smaller than 1 when the current voltage of the power supply is larger than the preset voltage, and the ratio between the preset voltage and the current voltage is greater than 1 when the current voltage of the power supply is smaller than the preset voltage.

As an example, when a battery is taken as the power supply, if the battery is overcharged or has a discharge failure, the current voltage of the battery is larger than the preset voltage, and the ratio between the preset voltage and the current voltage of the battery is less than 1; if the battery is used for a period of time, and the current voltage of the battery is less than the preset voltage, the ratio between the preset voltage and the current voltage of the battery is larger than 1.

Step S230 can be described in conjunction with step S220. If the current voltage is not equal to the preset voltage, it indicates that the motor is prone to a rotation speed error at the power supply voltage, which will cause a certain positional deviation or jitter when the servo is driven, and it is necessary to adjust the PWM signal for controlling the motor.

Since the ratio between the preset voltage to the current voltage is different when the PWM signal is adjusted, and the compensation value introduced during the adjustment is also different, by determining the ratio between the preset voltage and the current voltage, the influence of different current voltages on the motor can be differentiated, and the magnitude of the adjustment can be determined accurately, hence the target duty ratio can be determined more accurately.

It can be understood that, if the current voltage is equal to the preset voltage, the ratio between the preset voltage and the current voltage is equal to 1.

S240: outputting a target PWM signal according to the target duty ratio.

In step S240, the target PWM signal is utilized to control the motor to drive the servo, and the target duty ratio is utilized to describe the proportion of the high-level duration in a cycle within the target PWM signal.

It should be noted that, after outputting the target PWM signal according to the target duty ratio, if the posture or the operation state of the servo remains unchanged, the target PWM signal is continuously output.

In this embodiment, if the current voltage of the power supply is not equal to the preset voltage, it indicates that the motor will have a rotational speed deviation due to the voltage and cause the instability in the operation of the servo. In this case, by adjusting the PWM signal for controlling the motor the operate, the motor can operate in a relatively stable state when the current voltage of the power supply is too large or too small, thereby ensuring that the jittering or the larger error in the operating position will not appear when the servo is in operation.

As can be seen from the above, in this embodiment, the servo driving method is implemented by: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio, which controls the motor to drive the servo through the obtained target PWM signal, and realizes that the rotation speed of the motor will not become unstable due to the change of the output voltage of the power supply during the operation of the motor, thereby avoiding the instability in the operation of the servo.

If the current voltage is equal to the preset voltage, no operation is performed. When the current voltage is normal, it is unnecessary to adjust the PWM signal, thereby avoiding unnecessary operations during driving the servo.

In another embodiment of the present disclosure, a computer readable storage medium is provided. The computer readable storage medium stores one or more computer programs. When executed by a processor, the one or more computer program implements:

obtaining a current voltage of a power supply of the motor, if a control instruction for driving the servo is detected;

obtaining a duty ratio of a PWM (pulse width modulation) signal generated according to the control instruction and the current voltage, if the current voltage is not equal to a preset voltage;

calculating a target duty ratio based on a ratio between the preset voltage and the current voltage and the duty ration; and outputting a target PWM signal according to the target duty ratio, where the target PWM signal is for controlling the motor to drive the servo.

The control instruction is utilized to describe target position information of the servo, and when executed by the processor, the one or more computer program further implements:

calculating actual position information of the servo under the driving of the PWM signal according to the control instruction; and importing the target position information and the actual position information into a preset proportional adjustment PID control algorithm to perform a cycle operation to obtain the duty ratio.

When executed by the processor, the one or more computer program further implements:

calculating the duty ratio by the following formula:

$$P_V = U_p + U_i + U_d;$$

where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$.

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

When executed by the processor, the one or more computer program further implements:

calculating a voltage ratio between the preset voltage and the current voltage; and calculating a product of the voltage ratio and the duty ratio of the PWM signal to obtain the target duty ratio.

When executed by the processor, the one or more computer program further implements:

performing no operation, if the current voltage is equal to the preset voltage.

When executed by the processor, the one or more computer program further implements.

making the voltage ratio between the preset voltage and the current voltage not equal to 1.

As can be seen from the above, the embodiments of the present disclosure are implemented by: obtaining a current voltage of a power supply of the motor, if a control instruction for driving the servo is detected; obtaining a duty ratio of a PWM signal generated according to the control instruction and the current voltage, if the current voltage is not equal to a preset voltage; calculating a target duty ratio based on a ratio between the preset voltage and the current voltage and the duty ratio; and outputting a target PWM signal according to the target duty ratio. Which control the motor to drive the servo through the obtained target PWM signal, and realize that the rotation speed of the motor will not become unstable due to the change of the output voltage of the power supply during the operation of the motor, thereby avoiding the instability in the operation of the servo.

The computer readable storage medium may be an internal storage unit of the device of any of the above-mentioned embodiment, for example, a hard disk or a memory of a computer. The computer readable storage medium may also be an external storage device of the device, for example, a plug-in hard disk, a smart media card (SMC), a secure digital (SD) card, flash card, and the like, which is equipped on the device. Furthermore, the computer readable storage medium may further include both an internal storage unit and an external storage device, of the device. The computer readable storage medium is configured to store the computer program and other programs and data required by the device. The computer readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions in the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the specific operation process of the above-mentioned device and units, reference may be made to the corresponding processes in the above-mentioned method embodiments, and are not described herein.

In the several embodiments provided by the present disclosure, it should be understood that the disclosed systems, devices, and methods may be implemented in other manners. For example, the device embodiments described above are merely illustrative. For example, the division of units is only a division of logical function. In actual implementations, there may be another division manner, for example, multiple units or components may be combined or integrated into another system, or some features can be ignored or not executed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated unit is implemented in the form of a software functional unit and is sold or used as an independent product, which may be stored in a non-transitory computer-readable storage medium. Based on this understanding, the technical solution of the present disclosure contributes in essence or to the prior art, or all or part of the technical solution may be embodied in the form of a software product stored in a storage medium. There are a number of instructions for causing a computer device (which may be a personal computer, server, or network device, etc.) to perform all or part of the steps of the methods described in various embodiments of the present disclosure. The above-mentioned storage medium includes: a USB disk, a portable hard disk, a read-only memory (ROM), a random access memory (RAM), a magnetic disk, an optical disk, or other medium which can store program code.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented servo driving method for a servo of a robot, wherein the servo is driven by a motor, the method comprises executing on a processor the steps of:
   obtaining a current voltage of a power supply of the motor, in response to receiving, by a control circuit of the motor, a control instruction for driving the servo and describing target position information of the servo;
   obtaining a duty ratio of a PWM (pulse width modulation) signal generated according to the control instruction and the current voltage, in response to the current voltage being not equal to a preset voltage;
   calculating a target duty ratio based on a ratio between the preset voltage and the current voltage and the duty ratio; and
   outputting a target PWM signal according to the target duty ratio, wherein the target PWM signal is for controlling the motor to drive the servo;
   wherein the step of obtaining the duty ratio of the PWM signal generated according to the control instruction and the current voltage comprises:
   calculating actual position information of the servo under the driving of the PWM signal according to the control instruction; and
   importing the target position information and the actual position information into a preset proportional adjustment PID (proportional integral derivative) control algorithm to perform a cycle operation to obtain the duty ratio.

2. The method of claim 1, wherein the step of importing the target position information and the actual position information into the preset proportional adjustment PID control algorithm to perform the cycle operation to obtain the duty ratio comprises:
   calculating the duty ratio by the following formula:

$$P_V = U_p + U_i + U_d;$$

Where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$;
   $P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

3. The method of claim 1, wherein the step of calculating the target duty ratio based on the ratio between the preset voltage and the current voltage and the duty ratio comprises:
   calculating a voltage ratio between the preset voltage and the current voltage; and
   calculating a product of the voltage ratio and the duty ratio of the PWM signal to obtain the target duty ratio.

4. The method of claim 1, wherein the voltage ratio between the preset voltage and the current voltage is not equal to 1.

5. A servo driving apparatus for a servo of a robot, wherein the servo is driven by a motor, and the apparatus comprises:
   a first obtaining unit configured to obtain a current voltage of a power supply of the motor, in response to receiving, by a control circuit of the motor, a control instruction for driving the servo and describing target position information of the servo;
   a second obtaining unit configured to obtain a duty ratio of a PWM (pulse width modulation) signal generated according to the control instruction and the current voltage, in response to the current voltage being not equal to a preset voltage;

a first calculation unit configured to calculate a target duty ratio based on a ratio between the preset voltage and the current voltage and the duty ratio; and a signal generation unit configured to output a target PWM signal according to the target duty ratio, wherein the target PWM signal is for controlling the motor to drive the servo;

wherein the second obtaining unit comprises:

a calculation unit configured to calculate actual position information of the servo under the driving of the PWM signal according to the control instruction; and a second calculation unit configured to import the target position information and the actual position information into a preset proportional adjustment PID (proportional integral derivative) control algorithm to perform a cycle operation to obtain the duty ratio.

6. The apparatus of claim 5, wherein the second calculation unit is configured to:

calculate the duty ratio by the following formula:

$$P_V = U_p + U_i + U_d;$$

where, $U_p$ is a proportional term, and $U_p = K_p \times E_k$; $U_i$ is an integral term, and $U_i = K_i \lambda E_k$, $U_d$ is a differential term, and $U_d = K_d \times (E_k - E_{k1})$;

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

7. The apparatus of claim 5, wherein the first calculation unit is configured to:

calculate a voltage ratio between the preset voltage and the current voltage; and calculate a product of the voltage ratio and the duty ratio of the PWM signal to obtain the target duty ratio.

8. The apparatus of claim 5, wherein the voltage ratio between the preset voltage and the current voltage is not equal to 1.

9. A robot comprising:

at least a servo;

one or more processors;

a memory; and one or more computer programs stored in the memory and executed by the one or more processors, wherein the one or more computer programs comprise:

a first obtaining unit configured to obtain a current voltage of a power supply of the motor, in response to receiving, by a control circuit of the motor, a control instruction for driving the servo and describing target position information of the servo;

a second obtaining unit configured to obtain a duty ratio of a PWM (pulse width modulation) signal generated according to the control instruction and the current voltage, in response to the current voltage being not equal to a preset voltage;

a first calculation unit configured to calculate a target duty ratio based on a ratio between the preset voltage and the current voltage and the duty ratio; and a signal generation unit configured to output a target PWM signal according to the target duty ratio, wherein the target PWM signal is for controlling the motor to drive the servo;

wherein the second obtaining unit comprises:

a calculation unit configured to calculate actual position information of the servo under the driving of the PWM signal according to the control instruction; and a second calculation unit configured to import the target position information and the actual position information into a preset proportional adjustment PID (proportional integral derivative) control algorithm to perform a cycle operation to obtain the duty ratio.

10. The robot of claim 9, wherein the second calculation unit is configured to:

calculate the duty ratio by the following formula:

$$P_V = U_p + U_i + U_d;$$

where, $U_p$ is a proportional term, and $U_p = K_p \times E_k$; $U_i$ is an integral term, and $U_i = K_i \times E_k$; $U_d$ is a differential term, and $U_d = K_d \times (E_k - E_{k1})$;

$P_V$ is the duty ratio, $K_p$ is the preset proportional coefficient, $K_i$ is the preset integral coefficient, $K_d$ is the preset differential coefficient, $E_k$ is the difference between the current target position and the actual position in the cycle operation, and $E_{k1}$ is the difference between the previous target position and the actual position in the cycle operation.

11. The robot of claim 9, wherein the first calculation unit is configured to:

calculate a voltage ratio between the preset voltage and the current voltage; and calculate a product of the voltage ratio and the duty ratio of the PWM signal to obtain the target duty ratio.

12. The robot of claim 9, wherein the voltage ratio between the preset voltage and the current voltage is not equal to 1.

* * * * *